United States Patent
Tada

(10) Patent No.: US 6,237,040 B1
(45) Date of Patent: May 22, 2001

(54) HYPERTEXT TRANSMISSION METHOD AND SERVER APPARATUS FOR SENDING AND RECEIVING FILES OTHER THAN HTML FILES

(75) Inventor: Akihito Tada, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/110,444

(22) Filed: Jul. 7, 1998

(30) Foreign Application Priority Data

Jul. 8, 1997 (JP) .................................................. 9-182293

(51) Int. Cl.[7] .................................................. G06F 15/16
(52) U.S. Cl. ........................... 709/246; 709/203; 709/217
(58) Field of Search ..................................... 709/203, 217, 709/246; 707/10, 501

(56) References Cited

U.S. PATENT DOCUMENTS

| | | | |
|---|---|---|---|
| 5,649,186 | * | 7/1997 | Ferguson ................................ 707/10 |
| 5,675,507 | * | 10/1997 | Bobo, II ................................. 709/206 |
| 5,745,360 | * | 4/1998 | Leone et al. ........................... 707/513 |
| 5,764,916 | * | 6/1998 | Busey et al. ........................... 709/227 |
| 5,784,058 | * | 7/1998 | LaStrange et al. .................... 345/340 |
| 5,790,793 | * | 8/1998 | Higley ................................... 709/218 |
| 5,832,212 | * | 11/1998 | Cragun et al. ........................ 713/202 |
| 5,842,216 | * | 11/1998 | Anderson et al. .................... 707/203 |
| 5,848,413 | * | 12/1998 | Wolff ..................................... 707/10 |
| 5,854,897 | * | 12/1998 | Radziewicz et al. ................. 709/224 |
| 5,859,972 | * | 1/1999 | Subramaniam et al. ............. 709/203 |
| 5,890,172 | * | 3/1999 | Borman et al. ....................... 707/501 |
| 5,915,096 | * | 6/1999 | Rosenzweig et al. ................ 709/227 |
| 5,933,841 | * | 8/1999 | Schumacher et al. ............... 707/501 |
| 5,956,720 | * | 9/1999 | Fernandez et al. .................... 707/10 |
| 5,963,208 | * | 10/1999 | Dolan et al. .......................... 345/357 |
| 5,987,480 | * | 11/1999 | Donohue et al. ..................... 707/501 |
| 5,993,142 | * | 11/1999 | Genov et al. ...................... 414/744.5 |
| 5,999,912 | * | 12/1999 | Wodarz et al. ........................ 705/14 |

FOREIGN PATENT DOCUMENTS

| | | |
|---|---|---|
| 9-26972 | 1/1997 | (JP) . |
| 9-26973 | 1/1997 | (JP) . |
| 9-26974 | 1/1997 | (JP) . |
| 9-34772 | 2/1997 | (JP) . |
| 9-44527 | 2/1997 | (JP) . |
| 9-54782 | 2/1997 | (JP) . |

* cited by examiner

*Primary Examiner*—Saleh Najjar
(74) *Attorney, Agent, or Firm*—Finnegan, Henderson, Farabow, Garrett & Dunner, L.L.P.

(57) ABSTRACT

A method and an apparatus for processing e-mail with only a WWW browser. An HTML file is requested using the WWW browser on a user terminal apparatus. An Internet connection service provider apparatus (Internet Service Provider) using the HTML file request as a trigger automatically acquires a user's e-mail and then converts the e-mail to HTML format for storage. If e-mail is present, a markup tag to the e-mail list is added to the requested HTML file and transmitted to the user terminal apparatus. When the user selects this tag, the Internet connection service provider apparatus retrieves the corresponding e-mail HTML file and returns it to the user.

13 Claims, 13 Drawing Sheets

HYPERTEXT TRANSMISSION METHOD AND SERVER APPARATUS FOR SENDING AND RECEIVING FILES OTHER THAN HTML FILES

BACKGROUND OF THE INVENTION

1. Field of the Invention

The present invention relates to a hypertext transmission method and to a hypertext transmission server apparatus, and more particularly to a method for sending and receiving data other than HTML (HyperText Markup Language) files using a user terminal equipped with only a WWW (World Wide Web) browser.

2. Description of the Related Art

In order to use various services, such as Web browsing and electronic mail (e-mail), in an Internet connection via a telephone network (including via mobile telephone), a user terminal requires a program for implementing information communications with respective servers providing the various services over the Internet and a program for providing the acquired information to the user. More specifically, a WWW browser supporting HTTP (HyperText Transfer Protocol) is required in addition to PPP and TCP/IP for the transfer of information with WWW servers, and an e-mail program supporting SMTP (Simple Mail Transfer Protocol), POP3, or the like is required for transfer of information with mail servers.

Thus, a user must install and activate a program for each service whenever a service is to be received over the Internet, resulting in problems of increased memory requirements and poor usability.

Some WWW browsers include functions for sending and receiving e-mail. However, these browsers basically have built-in e-mail programs so that the WWW browser and the e-mail software exist as one unit.

Techniques have been proposed, such as in Japanese Patent Laid-Open Publication No. Hei 9-34772, in which files transmitted from a WWW server according to request are compressed to adjust the amount of data, then transmitted to a client. However, these techniques are only for files that have been requested by a user, and do not include ideas for processing other data not directly requested by the user, such as processing e-mail data together with HTML files.

SUMMARY OF THE INVENTION

It is therefore an object of the present invention to provide a method and an apparatus to enable the automatic processing of non-HTML data, such as e-mail data, even if a user terminal has only a WWW browser that handles HTML files.

In order to achieve the above-mentioned object, a hypertext transmission method of the present invention includes steps of (a) acquiring in response to an HTML file request from a user a corresponding HTML file from a communications network, (b) executing a predetermined data acquisition program and acquiring non-HTML data from the aforementioned communications network, (c) converting the non-HTML data acquired in step (b) into HTML data, (d) adding a tag for linking to the HTML data obtained in step (c) to the HTML file acquired in step (a) and transmitting to the aforementioned user.

Preferably, the non-HTML data may be e-mail data, and the predetermined data acquisition program may be triggered for activation by an HTML file request from the user. Namely, at the HTML file request from the user, not only the corresponding HTML file but also non-HTML data, such as e-mail data, is automatically acquired from a communications network.

Furthermore, a step (e) is preferably included after step (d) for transmitting the HTML data in accordance with a data request from the user. The user can request the HTML data by selecting the tag, and by transmitting the HTML data according to this request, non-HTML data can be displayed, such as on a WWW browser at the user terminal.

Furthermore, in order to achieve the above-mentioned object, a hypertext transmission server apparatus of the present invention may include HTML file acquisition means for acquiring, in response to an HTML file request from a user, a corresponding HTML file from a communications network, non-HTML data acquisition means for acquiring non-HTML data from the communications network, conversion means for converting the non-HTML data into HTML data, addition means for adding a tag to the HTML file for a link to the HTML data, and file transmission means for transmitting to the user the HTML file to which the tag has been added.

Preferably, the non-HTML data is e-mail data, and the HTML data acquisition means is triggered for operation by the HTML file request from the user.

Furthermore, the apparatus of the present invention preferably includes data transmission means for transmitting the HTML data to the user in accordance with a request from the user. The user can request the HTML data by selecting the added tag, and by having the server apparatus transmit the HTML data according to this request, non-HTML data can also be displayed, such as on a WWW browser at the user terminal.

DETAILED DESCRIPTION OF THE PREFERRED EMBODIMENT

An embodiment of the present invention is described hereinafter with reference to the attached drawings.

Figure 1:
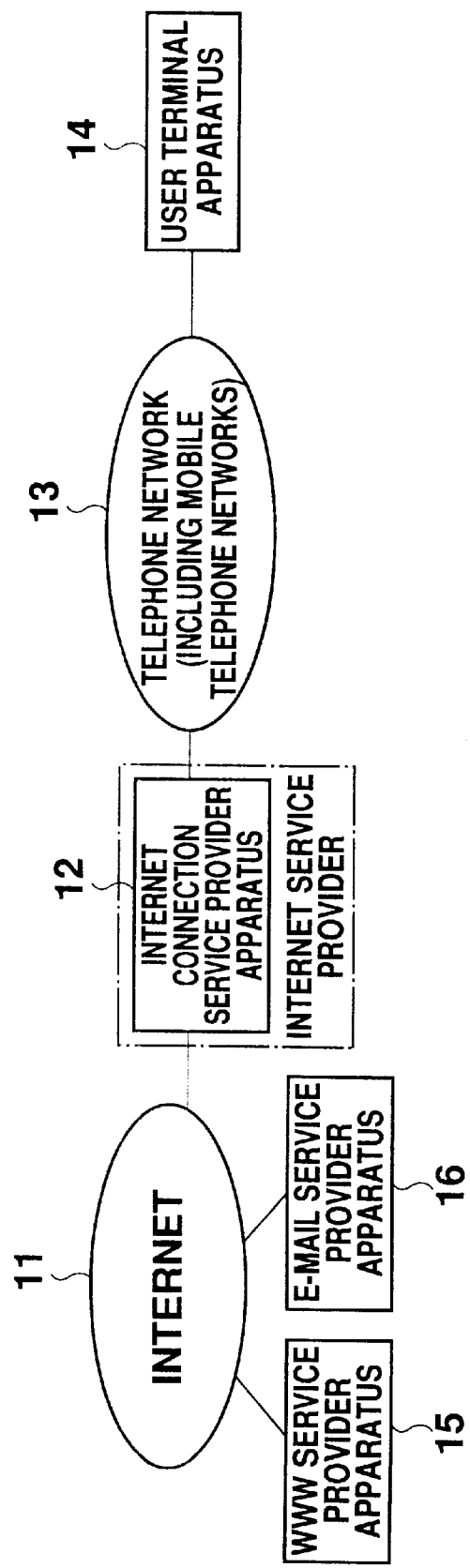
FIG. 1 shows an overall configuration of an embodiment of the present invention.

FIG. 1 shows a system configuration of the present embodiment. To the Internet 11 is connected an Internet connection service provider apparatus 12, or what is commonly called an Internet service provider. A user terminal apparatus 14 connects to this Internet connection service provider apparatus 12 via a telephone network 13 including mobile telephones so that various types of services provided over the Internet by a WWW service provider apparatus 15 or an e-mail service provider apparatus 16 can be received. In this embodiment, only a program (WWW browser) for receiving WWW services is installed in the user terminal apparatus 14, and this WWW browser is to be used to receive e-mail data, which is a non-HTML file.

Figure 2:
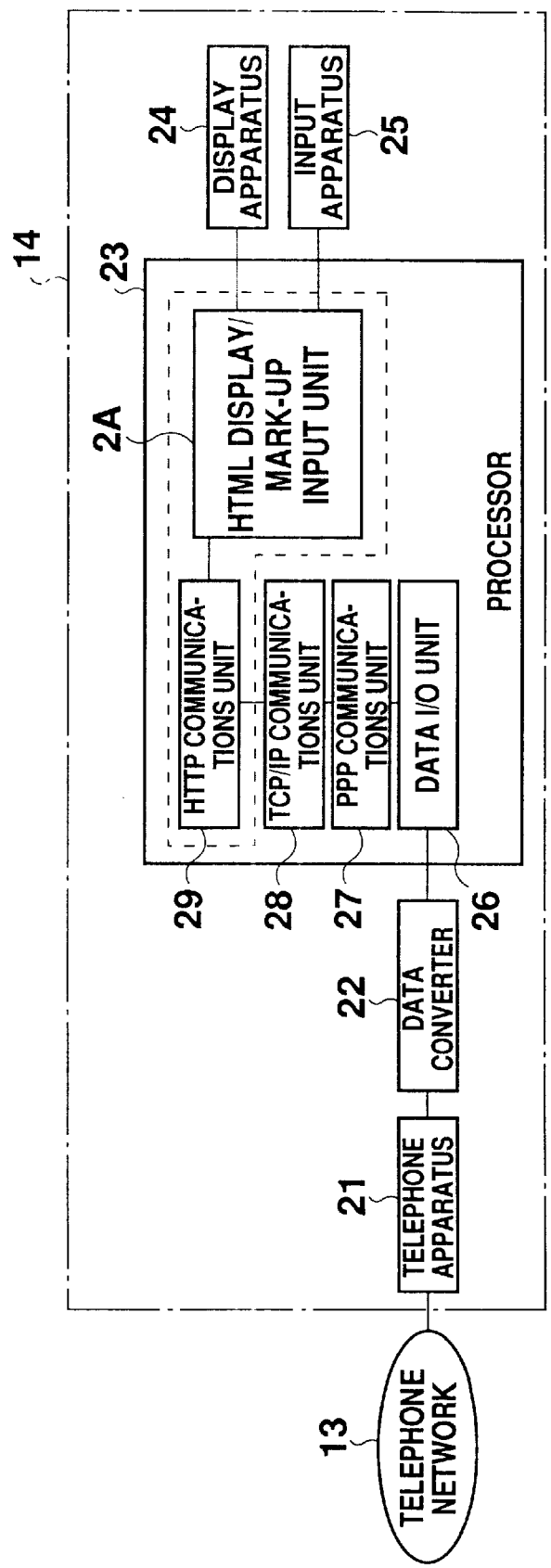
FIG. 2 shows a configuration of a user terminal apparatus.

FIG. 2 shows a block diagram of the user terminal apparatus 14. The terminal apparatus 14 comprises a telephone apparatus 21 for connecting to the telephone network 13, a data conversion apparatus 22, such as a modem, a processor 23, a display apparatus 24 for displaying data, and an input apparatus 25 for inputting data. The functional block of the processor 23 includes a data I/O unit 26, a PPP communications unit 27 for connection with the Internet connection service provider apparatus 12, a TCP/IP communications unit 28, an HTTP communications unit 29 for receiving WWW services, and an HTML display/markup input unit 2A. The HTTP communications unit 29 and HTML display/markup input unit 2A are implemented in WWW browser software, and the PPP communications unit 27 and TCP/IP communications unit 28 are implemented in an OS. When an HTML file is desired, the user activates the WWW browser, inputs a uniform resource locator (URL) specifying a WWW service, and transmits it to the provider using a low-layer communications program (PPP and TCP/IP).

Figure 3:
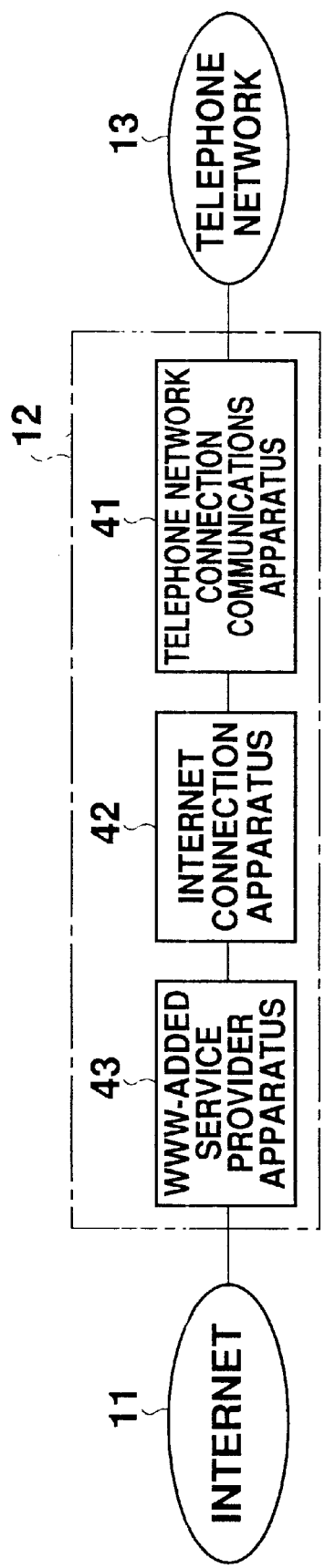
FIG. 3 shows a configuration of an Internet connection service provider apparatus.

FIG. 3 shows a block diagram of the Internet connection service provider apparatus 12 at the Internet service provider. The Internet connection service provider apparatus 12, which is disposed between the Internet 11 and the telephone network 13, is used to connect the user terminal apparatus 14 to the Internet, and includes a telephone network connection communications apparatus 41, an Internet connection apparatus 42, and a WWW-added service provider apparatus 43. When a service request from the user terminal apparatus 14 to the WWW server is received, the received information is supplied to the Internet connection apparatus 42 and the connection apparatus 42 extracts information according to an Internet communications protocol (TCP/IP) from the received information, and supplies the extracted information to the WWW-added service provider apparatus 43. When an HTML file request is issued from the WWW browser on the user terminal apparatus 14, the WWW-added service provider apparatus 43, which is one characteristic of the present embodiment, triggered by the request also acquires e-mail data and then transmits it to the user.

Figure 4:
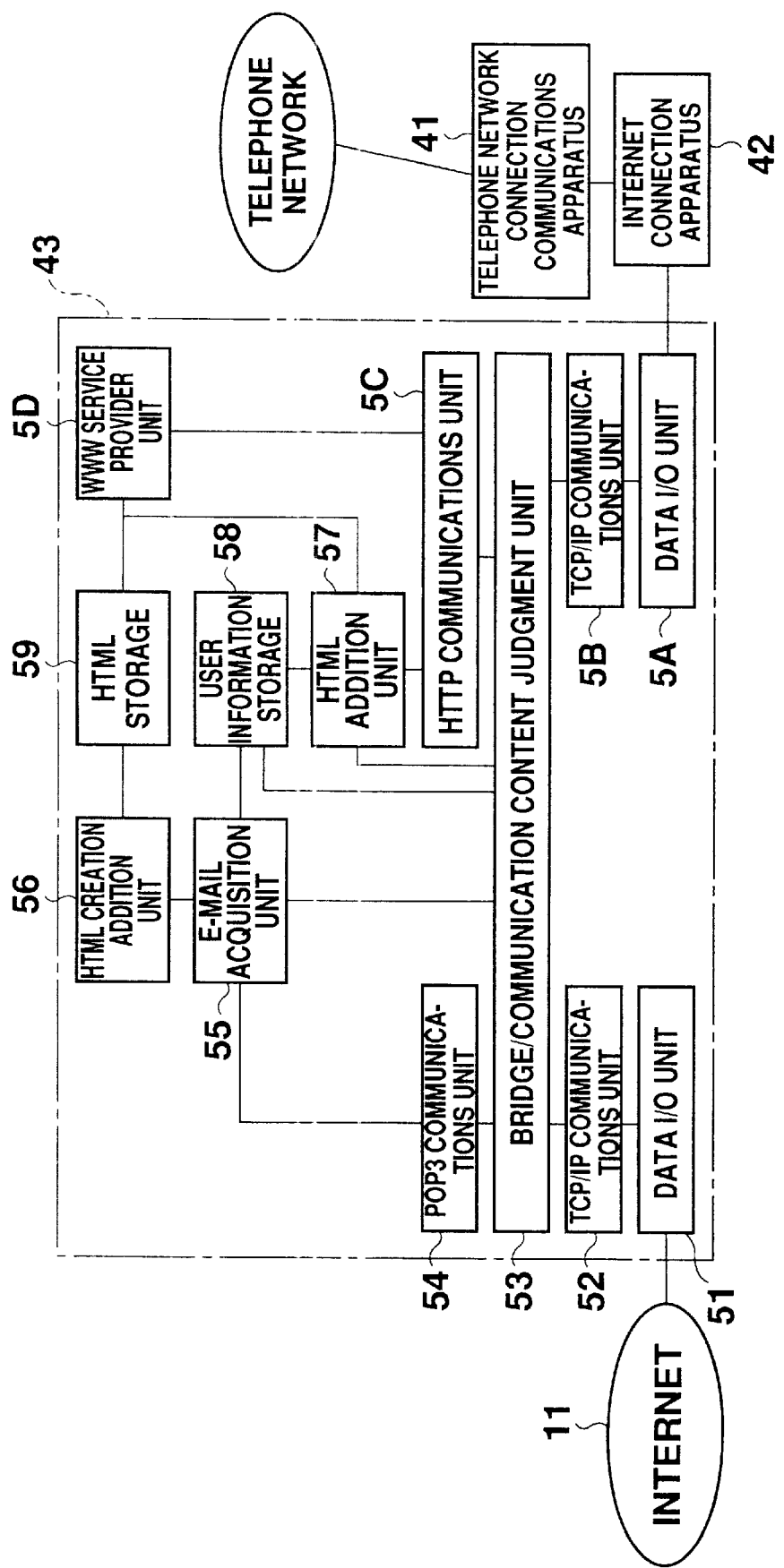
FIG. 4 shows a configuration of a WWW-added service provider. apparatus.

FIG. 4 shows a block diagram of the WWW-added service provider apparatus 43. A data I/O unit 5A of the WWW-added service provider apparatus 43 receives information from the connection apparatus (PPP server) 42 and supplies it to a bridge/communication content judgment unit 53 via a TCP/IP communications unit 52. The bridge/communication content judgment unit 53 temporarily holds the received information, and supplies it to a TCP/IP communications unit 52 on the Internet side after confirming the request content. The TCP/IP communications unit 52 on the Internet side transmits the request content from the user onto the Internet via a data I/O unit 51.

When the request content from the user is sent onto the Internet, the source address of the information (IP address of information transmission origin) and high-layer protocol (HTTP, SMTP, FTP, or the like) are monitored. If the transmission is from a user IP address stored in a user information storage 58 and the high-layer protocol is HTTP for requesting an HTML file, the user ID corresponding to the user IP address and the fact that the user issued a WWW service request to the Internet are transmitted to an e-mail acquisition unit 55, and further the destination IP address and HTML file name ("/index.htm" or "/index.html" if not specified) are stored into the user information storage 58. The e-mail acquisition unit 55 acquires information (POP account and password for mail server) and user IP address, necessary for automatically acquiring e-mail addressed to the user who requested the WWW service, from the user information storage 58 storing in advance the information necessary for acquiring the user's e-mail, and sets the user IP address as the origin for the reply and issues a request to the e-mail service provider apparatus (mail server) 16 specified by the user on the Internet for service to receive e-mail via the TCP/IP communications unit 52 and a POP3 communications unit 54, which are low-layer programs on the Internet side. At this time, the bridge/communication content judgment unit 53 supplies the information received from the POP3 communications unit 54 directly to the TCP/IP communications unit 52.

When a reply from the e-mail service provider apparatus 16 (mail server) is received, the bridge/communication content judgment unit 53 temporarily holds the received mail data, and supplies it after confirming the information content to the TCP/IP communications unit 5B at the user's side and transmits it to the Internet connection apparatus 42. At this time, the destination IP address for the information (IP address of the destination for the information) and the high-layer protocol are monitored. If the transmission is a reply to the user IP address stored in the user information storage 58 and the high-layer protocol is POP3, the received information (mail data) is supplied, not to the TCP/IP communications unit 5B on the user's side, but directly to the e-mail acquisition unit 55. The e-mail acquisition unit 55 acquires the destination IP address of the received information and the user ID of the addressed user of the received e-mail from the user IP address acquired from the user information storage 58, and supplies the received e-mail and the user ID to an HTML creation/addition unit 56. The HTML creation/addition unit 56 converts the received e-mail to an HTML file and newly stores this into an e-mail HTML file group for each user ID held in an HTML storage 59. Furthermore, a markup tag is added to the e-mail list HTML file for the user for linking to the newly added e-mail HTML file.

On the other hand, when the HTML file, which is the user's original request, is returned from the WWW service provider apparatus 15 (WWW server), the bridge/communication content judgment unit 53 temporarily holds the received information, and supplies it after confirming the information content to the TCP/IP communications unit 5B at the user's side and transmits it to the Internet connection apparatus 42. At this time, the IP address for the information, the source IP address, and the high-layer protocol are monitored. If the transmission is a reply to the user IP address and a reply from the IP address to which a WWW service request was made, and the high-layer protocol is HTTP, the received information (HTML file) is supplied, not to the TCP/IP communications unit 5B, but directly to an HTML addition unit 57 via an HTTP communications unit 5C. The HTML addition unit 57 checks whether an e-mail HTML file for the user of the return address is present in the HTML storage 59, which holds e-mail HTML files for users. If such a file is found, information, such as stored position of the file and the file name, is acquired from the HTML storage 59, and a markup tag is created for linking to an e-mail list HTML file. The created markup tag is added to the received HTML file for reply and this is transmitted to the Internet connection apparatus 42.

Figure 5:
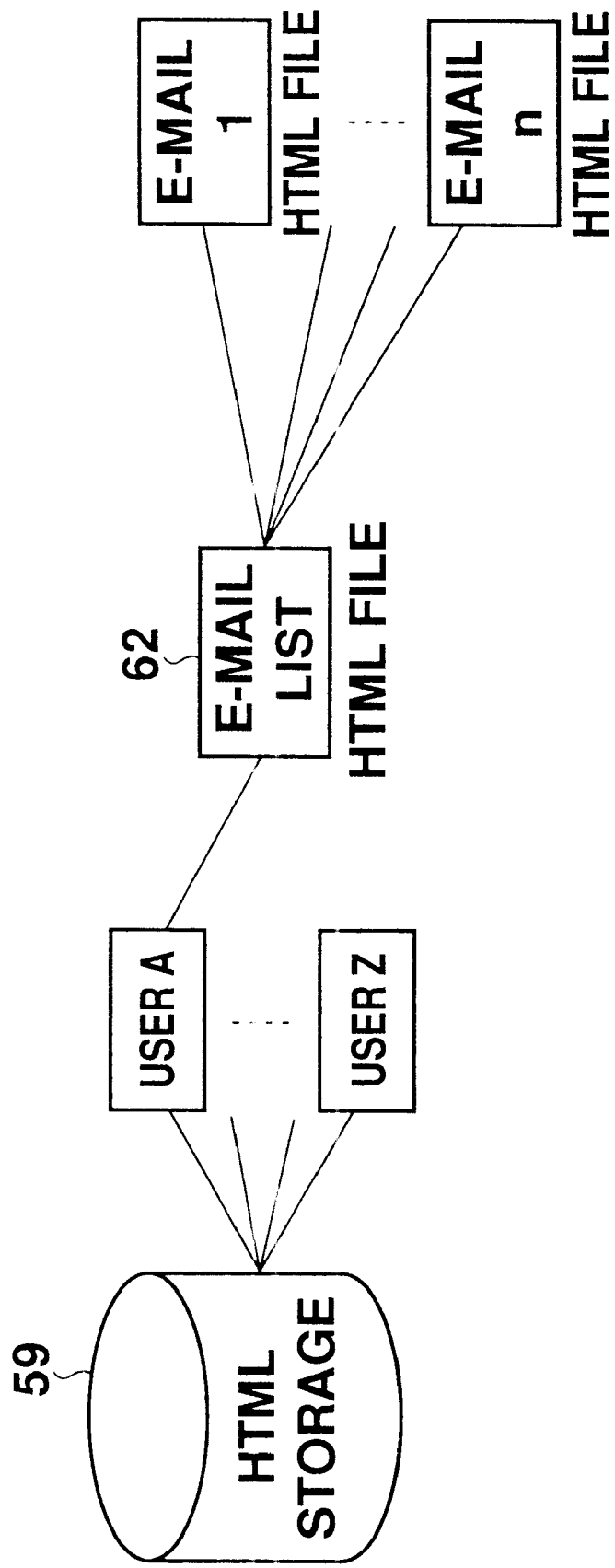
FIG. 5 illustrates file organization of an HTML storage.

FIG. 5 shows a typical file organization for the HTML storage 59. In this storage, an e-mail list HTML file 62 is created for each user, such as user A, B, and so forth, and to each e-mail list HTML file is associated e-mail HTML files (1) to (n).

Figure 6:
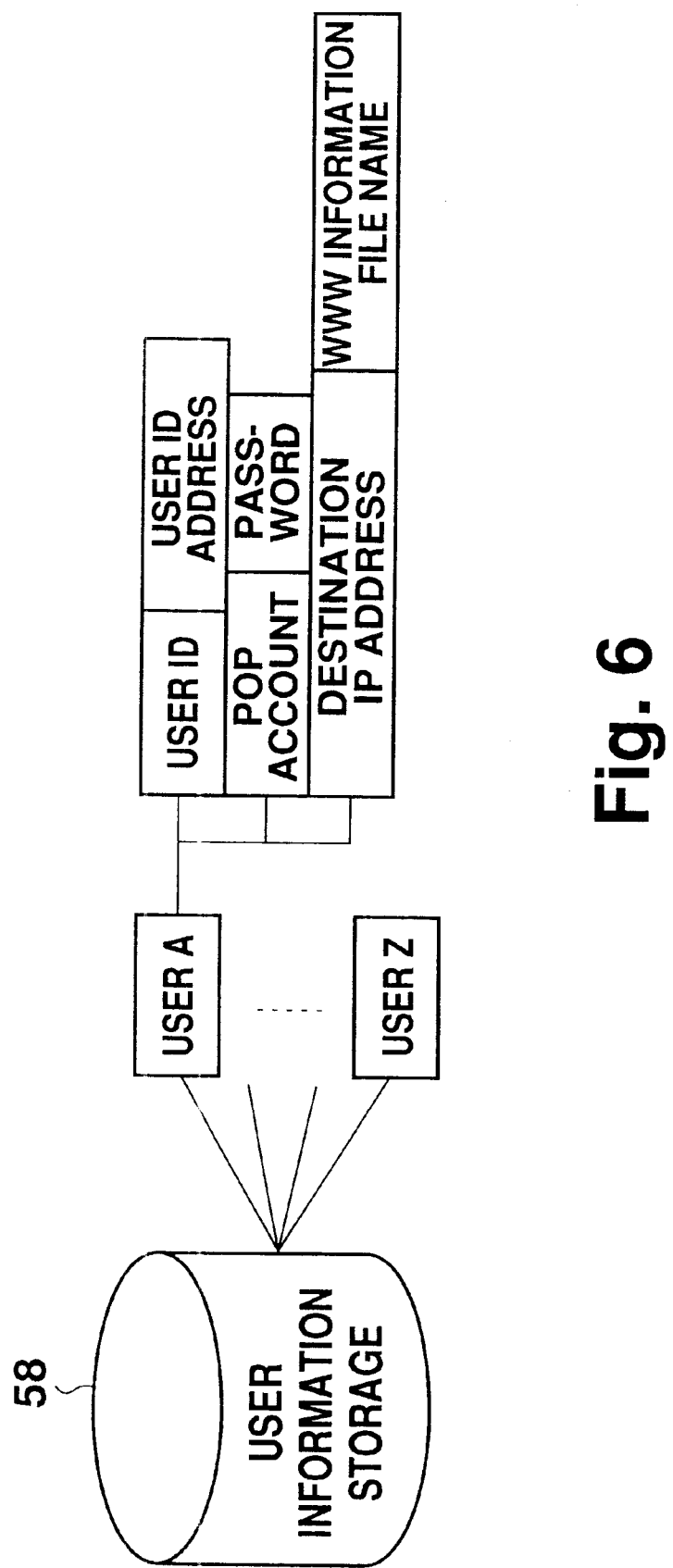
FIG. 6 illustrates contents of data of a user data storage.

FIG. 6 shows a typical data organization of the user is information storage 58. As described above, the user ID, user IP address, POP account, password, destination IP address, and WWW information file name are stored for each user.

Thus, a WWW service request from the user triggers the WWW-added service provider apparatus 43 to automatically acquire the user's e-mail, convert the e-mail data into an HTML file, and further return to the user an HTML file, which is a reply to the WWW service request, with a markup tag added for linking to an e-mail list HTML file. As a result, the presence of e-mail addressed to the user can be easily recognized with only the WWW browser at the user terminal apparatus 14.

When the user recognizes the presence of e-mail and uses the terminal apparatus 14 to select the markup tag linking to the e-mail list HTML file, a WWW service provider unit 5D returns the e-mail list HTML file and a file associated thereto (graphics or music file) from the HTML storage 59. When the user selects a specific file from the list, the WWW service provider unit 5D acquires the selected e-mail HTML file and the file associated thereto from the HTML storage 59 and returns them to the user terminal apparatus 14. The WWW service provider unit 5D deletes the e-mail HTML file returned to the user terminal apparatus 14 from the HTML storage 59 and simultaneously also deletes the markup tag linking to the deleted e-mail HTML file within the e-mail list HTML file. This enables e-mail to be received with a WWW browser.

The entire process of the present embodiment is further described in detail with reference to flowcharts.

Figure 7:
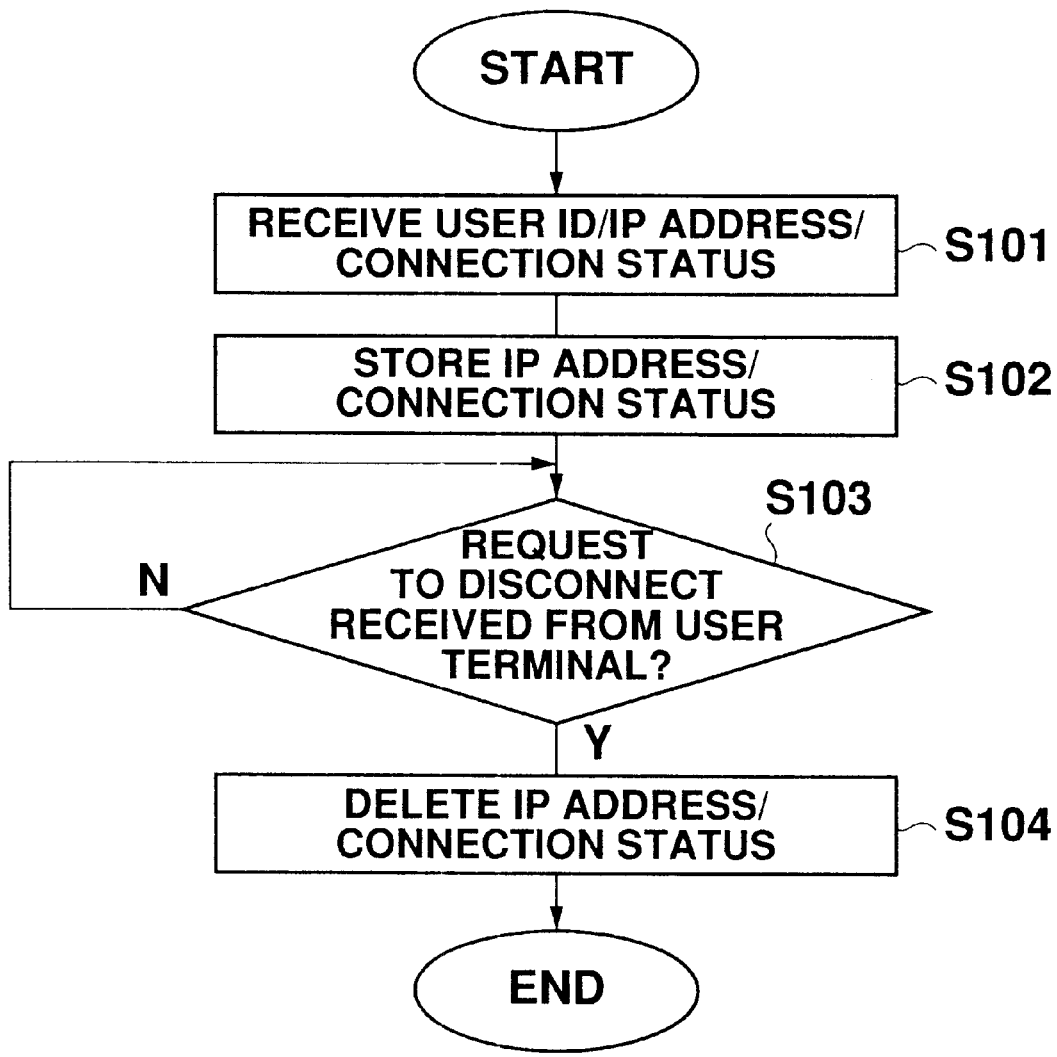
FIG. 7 is a flowchart of the WWW-added service provider apparatus during user connection and disconnection.

FIG. 7 illustrates a process for the WWW-added service provider apparatus 43 for the user connecting to or disconnecting from the Internet connection service provider apparatus 12. When the user first issues a call using the terminal apparatus 14, the Internet connection apparatus 42 authenticates the user and assigns an IP address, which is a terminal identifier on the Internet. Since the user ID and IP address are sent to the WWW-added service provider apparatus 43, the WWW-added service provider apparatus 43 receives this information (S101). Next, the WWW-added service provider apparatus 43 stores the user IP address into the user information storage 58 (S102). When a disconnect request transmitted by the user is received (S103), the stored IP address is deleted, and the process is terminated (S104).

Figure 8:
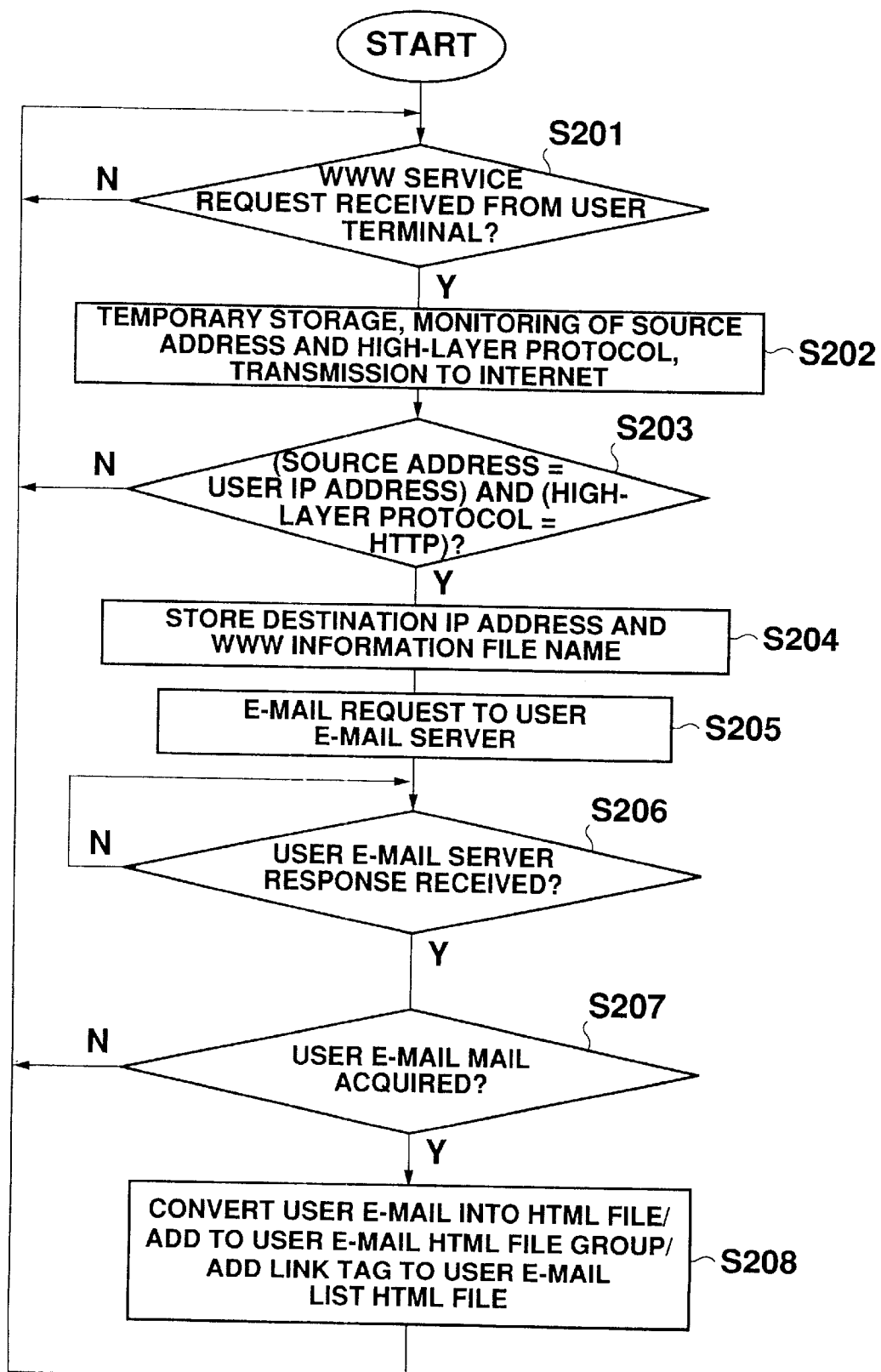
FIG. 8 is a flowchart of the WWW-added service provider apparatus during WWW service request.

FIG. 8 is a process for the WWW-added service provider apparatus 43 when there is a WWW service request from the user terminal apparatus 14. When the WWW service request (HTML file request) is first received (S201) from the user terminal apparatus 14, the request content is temporarily stored and the source address of the request content and the high-layer protocol (HTML or not) are monitored, and the request content is then transmitted through the Internet (S202). If, as a result of monitoring the request content, the source code is the user IP address stored in advance in the user information storage 58 and the high-layer protocol is HTTP (YES at S203), the destination IP address and the WWW information file name are stored into the user information storage 58 (S204). The e-mail acquisition unit 55 is then triggered by the WWW service request (HTML file request) from the user and executes an e-mail acquisition program to issue a request for e-mail service (S205) to the user's e-mail service provider apparatus 16 (mail server). When a response is received (S206) from the e-mail service provider apparatus 16 (mail server), e-mail addressed to the user is acquired (S207) and this user e-mail data is converted to HTML data (e-mail HTML file). The converted HTML data is newly added to the user e-mail HTML file group and a link tag is added to the user e-mail list HTML file (S208).

Figure 9:
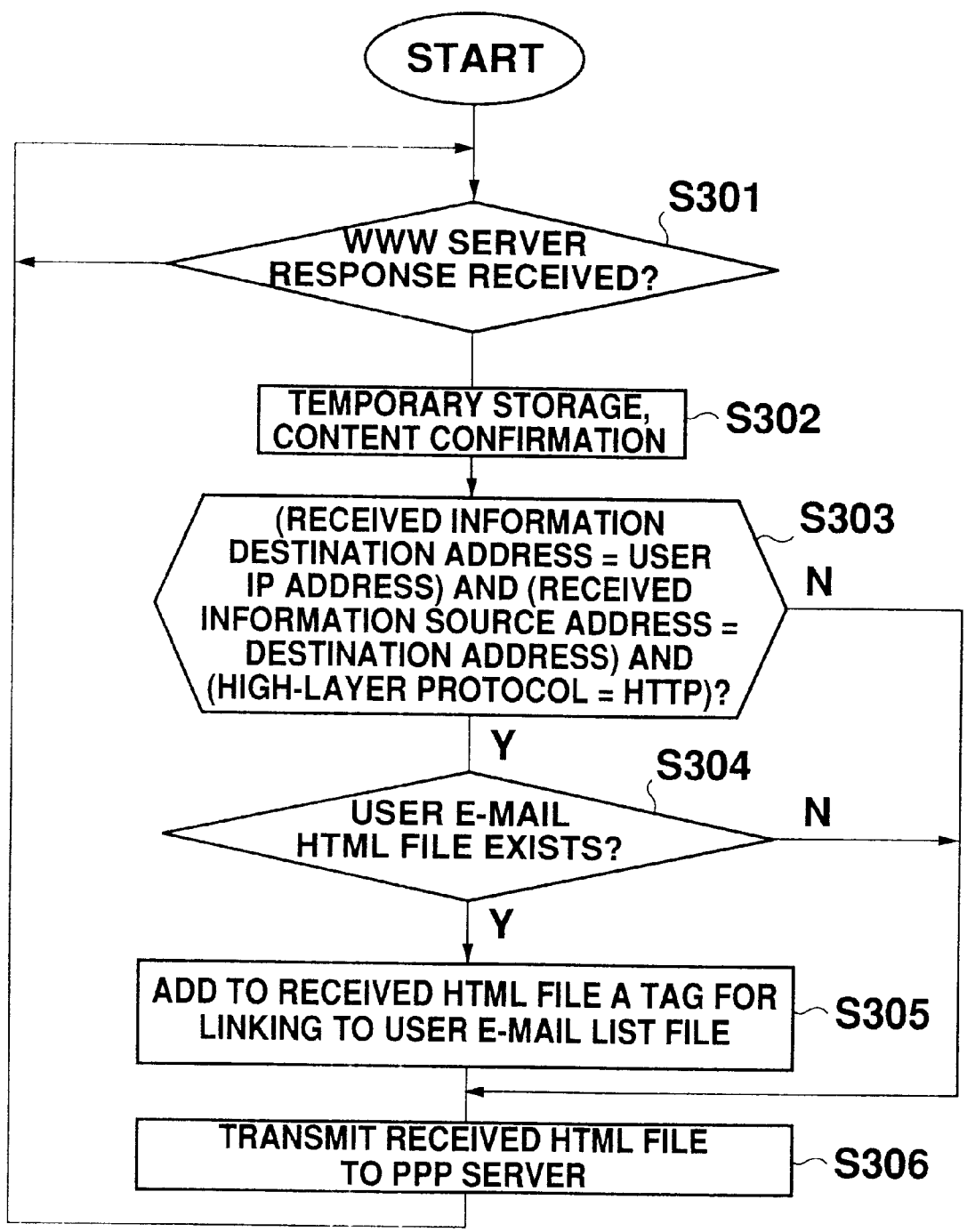
FIG. 9 is a flowchart of the WWW-added service provider apparatus during a reply from a WWW server.

FIG. 9 illustrates a process for the WWW-added service provider apparatus 43 when the HTML file requested by the user is transmitted from the WWW service provider apparatus 15 (WWW server). When a response is first received from the WWW server (S301), the received information is temporarily stored and its contents confirmed (S302). Then, it is confirmed that the destination address of the received information is the user IP address, the source address of the received information is the destination address, and whether or not the high-layer protocol is HTTP (S303). If all conditions are satisfied, it is next judged (S304) whether or not an e-mail HTML file for the concerned user is found in the user e-mail file group that was created in step S208 above. If found, a link tag to the e-mail list HTML file of the user is added to the user requested HTML file received from the WWW server (S305). The requested HTML file with the added link tag is transmitted (S306) to the Internet connection apparatus 42 (PPP server).

Figure 10:
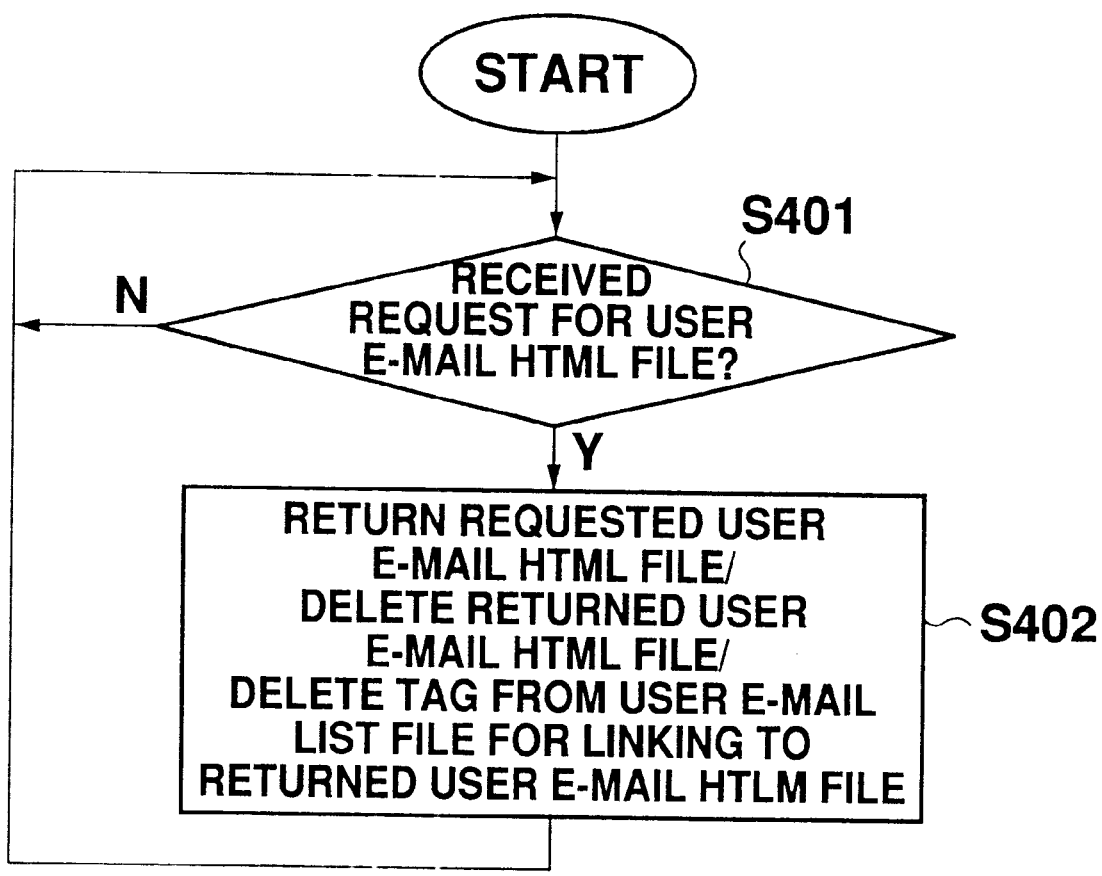
FIG. 10 is a flowchart of the WWW-added service provider apparatus during a user request for e-mail and HTML file.

FIG. 10 illustrates a process of the WWW-added service provider apparatus 43 when there is a user e-mail HTML file request from the user terminal apparatus 14. When the user transmits a request for an e-mail HTML file from the HTML display/markup input unit 2A on the terminal apparatus 14, this is received (S401), the requested user e-mail HTML file is read and returned from the HTML storage 59, and the returned user e-mail HTML file is deleted from the storage 59. Further, the link tag to the returned user e-mail HTML file in the user e-mail list HTML file is deleted (S402).

Figure 11A:
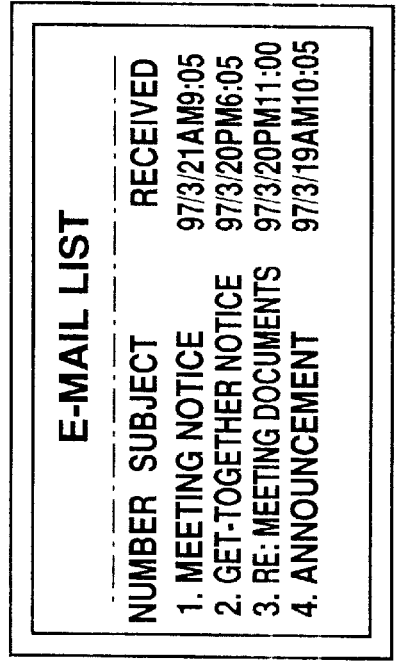
FIG. 11A shows an example screen that may be displayed on the user terminal apparatus when there is no e-mail data.
Figure 11C:
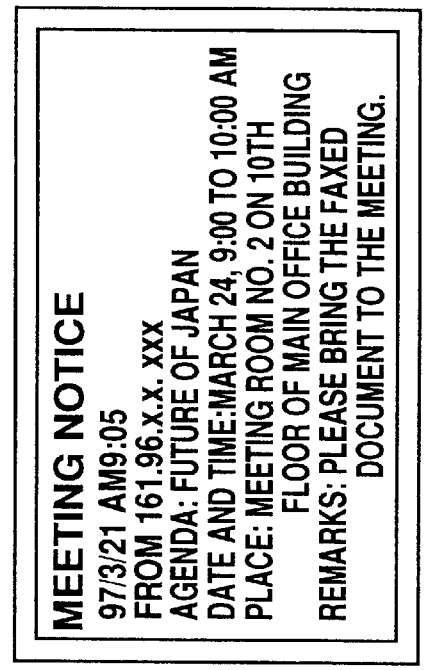
FIG. 11C shows an example screen that may be displayed on the user terminal apparatus when e-mail data is requested.
Figure 11B:
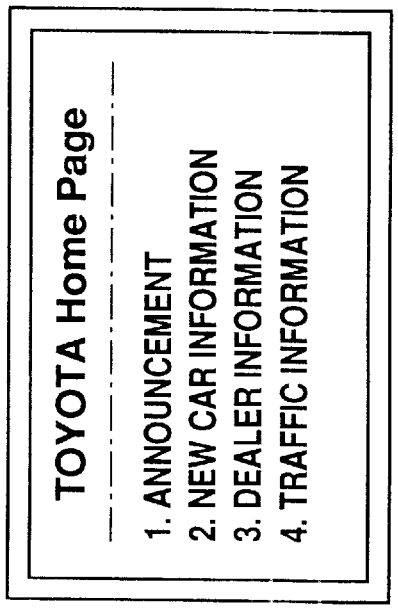
FIG. 11B shows an example screen that may be displayed on the user terminal apparatus when there is e-mail data.
Figure 11D:
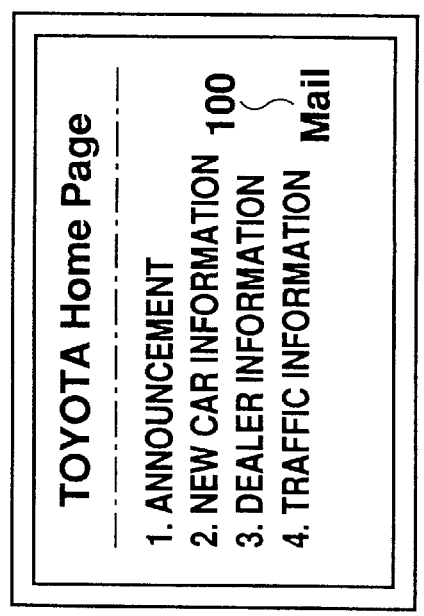
FIG. 11D shows an example screen that may be displayed on the user terminal apparatus when e-mail data is received.

FIGS. 11A to 11D show examples of screens displayed on the user terminal apparatus 14. FIG. 11A is a screen of a requested HTML file returned from the WWW-added service provider apparatus 43 for a case where there is no e-mail addressed to the user. An ordinary home page screen is displayed and the link tag to the user e-mail list HTML file is not displayed. On the other hand, FIG. 11B shows a case where there is e-mail addressed to the user. Since a markup tag for linking is added to the requested HTML file by the HTML addition unit 57 of the WWW-added service provider apparatus 43, a tag 100 called "Mail" is displayed at the bottom right of the home page as shown in FIG. 11B. When the user selects this tag 100, the screen shown in FIG. 11C appears, and the user e-mail list HTML file created by the HTML creation/addition unit 56 of the WWW-added service provider apparatus 43 is displayed so that the kind of incoming mail can be determined. When the user then selects any item (such as no. 1) from this list, a screen such as shown in FIG. 11D appears and the e-mail content is displayed as an HTML file. In this manner, e-mail can be received with just the WWW browser. Although the tag 100 to the e-mail list HTML file is added to the bottom right of the requested HTML file in the screen of FIG. 11B, it is preferable to change the way this addition is made of the tag 100 according to the user terminal apparatus 14.

Figure 12:
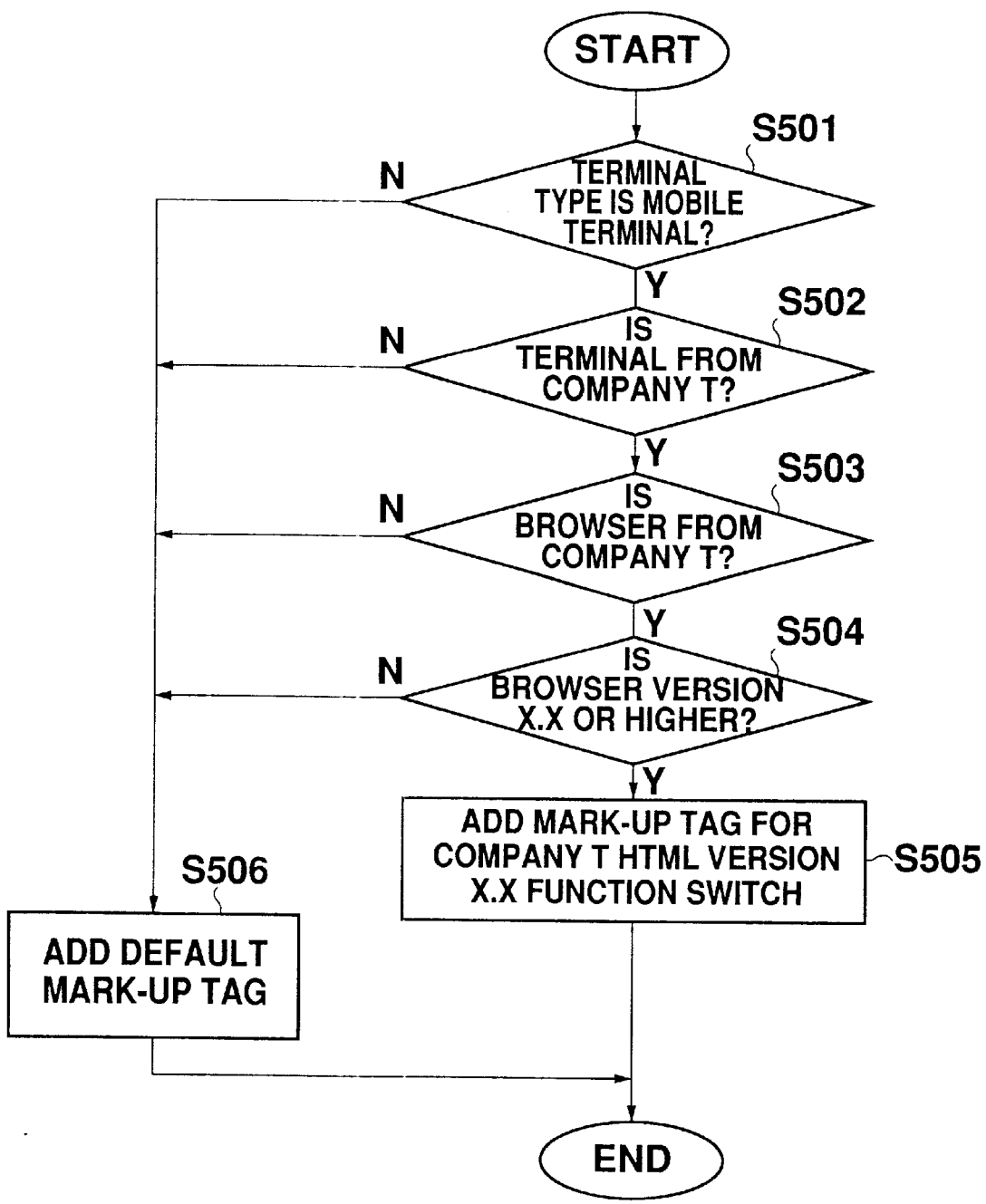
FIG. 12 is a flowchart for tag attachment for the WWW-added service provider apparatus.

FIG. 12 shows a flowchart of a process for the WWW-added service provider apparatus 43 for a case where the tag 100 is to be added according to the configuration of the user terminal apparatus 14. It is first judged whether or not the type of the user terminal apparatus 14 is a mobile terminal (S501). This judgment is performed on the basis of terminal types stored in advance in the user information storage 58. If the user terminal apparatus 14 is a mobile terminal, it is judged whether the terminal is a product of company T or another company (S502). If the terminal is a product of company T, it is further confirmed whether or not the browser is an original of company T (S503). If the browser is an original of company T, the version of the WWW browser is checked (S504), and a tag matching the configuration of the terminal is added (S505). On the other hand, in other cases (such as if the WWW browser is not a product of company T), the tag 100 is added as a default (S506) as shown in FIG. 11B.

Figure 13:
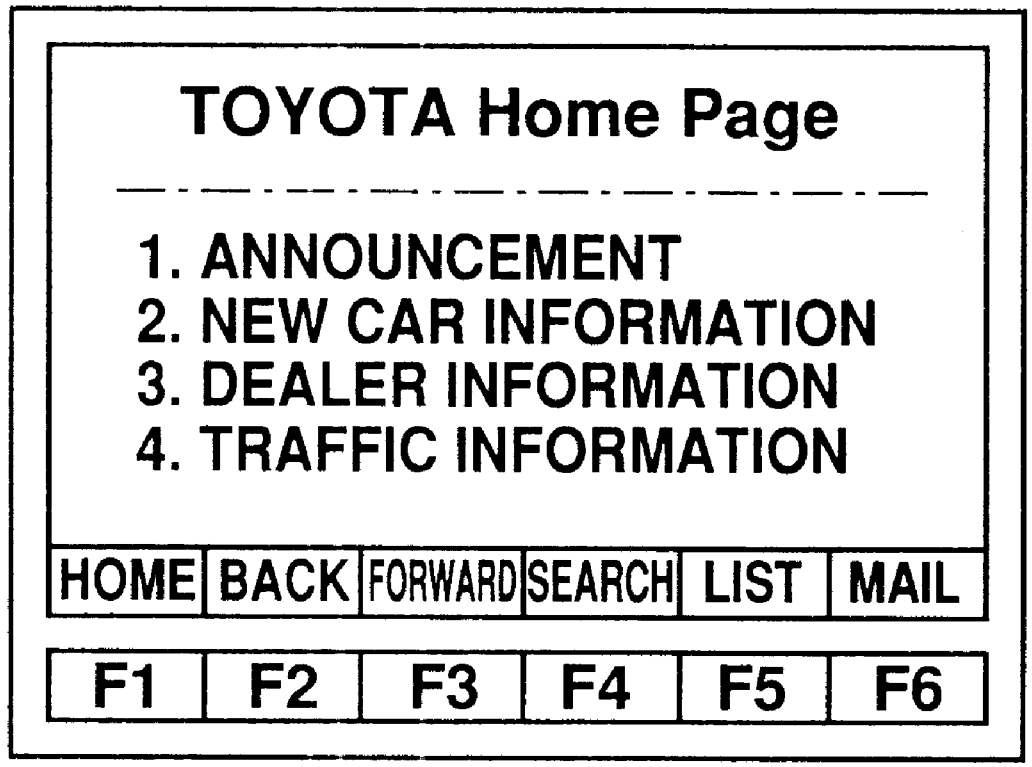
FIG. 13 shows an example screen for tag attachment according to the process in FIG. 12.

FIG. 13 shows an example of the requested HTML file displayed on the user terminal apparatus 14 after step S505. As an original WWW browser, function keys and their functions are displayed at the bottom of the screen, and the tag for "Mail" has been added for "F6". Adding the markup tag in this manner according to the configuration of the user terminal apparatus 14 allows a more user-friendly system to be designed.

Although the preceding description dealt with receiving e-mail, the WWW browser can be used also to transmit e-mail. In such a case, mail may be created in the HTML format and transmitted to the Internet connection service provider apparatus 12 using the HTTP protocol. It is then a simple matter for the WWW provider service unit 5D in the WWW-added service provider apparatus 43 to receive the HTML-format e-mail data and transmit the data through the Internet using a protocol such as SMTP.

According to the present invention as described above, when the user terminal has only the WWW browser, non-HTML data, in particular e-mail data, can be automatically processed.

While there have been described what is at present considered to be a preferred embodiment of the present invention, it will be understood that various modifications may be made thereto, and it is intended that the appended claims cover all such modifications as fall within the true spirit and scope of the invention.

What is claimed is:

1. A hypertext transmission method comprising the steps of:

(a) acquiring in response to an HTML file request from a user a corresponding HTML file from a communications network;

(b) acquiring non-HTML data from said communications network;

(c) converting said non-HTML data acquired in said step (b) into HTML data; and (d) adding a tag to said HTML file obtained in said step (a) for linking to said HTML data acquired in said step (c), and transmitting to said user, wherein the tag is displayed on any web page that the user accesses until the tag is selected by the user.

2. A hypertext transmission method according to claim 1 wherein said non-HTML data is e-mail data.

3. A hypertext transmission method according to claim 1 wherein said step (b) is triggered for execution by said HTML file request from said user.

4. A hypertext transmission method according to claim 1 further including after said step (d) a step for:

(e) transmitting said HTML data in response to data request from said user.

5. A hypertext transmission method according to claim 4 further including after step (e) a step for:

(f) deleting said HTML data transmitted in step (e) from a memory when said HTML data obtained in said step (c) is stored in said memory.

6. A hypertext transmission method according to claim 1 wherein said tag is added in a format according to a terminal used by a user.

7. A hypertext transmission server apparatus comprising:

HTML file acquisition means for acquiring in response to an HTML file request from a user a corresponding HTML file from a communications network;

non-HTML data acquisition means for acquiring non-HTML data from said communications network;

conversion means for converting said non-HTML data into HTML data;

addition means for adding a tag to said HTML file for linking to said HTML data; and file transmitting means for transmitting to said user, wherein the tag is displayed on any web page that the user accesses until the tag is selected by the user.

8. A hypertext transmission server apparatus according to claim 7 wherein said non-HTML data is e-mail data.

9. A hypertext transmission server apparatus according to claim 7 wherein said non-HTML data acquisition means is triggered for operation by said HTML file request from said user.

10. A hypertext transmission server apparatus according to claim 7 further comprising:

data transmitting means for transmitting said HTML data to said user in response to a request from said user.

11. A hypertext transmission server apparatus according to claim 7 further comprising:

storage means for storing said HTML data.

12. A hypertext transmission server apparatus according to claim 11 further comprising:

deletion means for deleting from said storage means said HTML data transmitted to a user.

13. A hypertext transmission server apparatus according to claim 7 wherein said said addition means adds said tag in a format according to a user terminal apparatus.

* * * * *